Patented Dec. 10, 1935

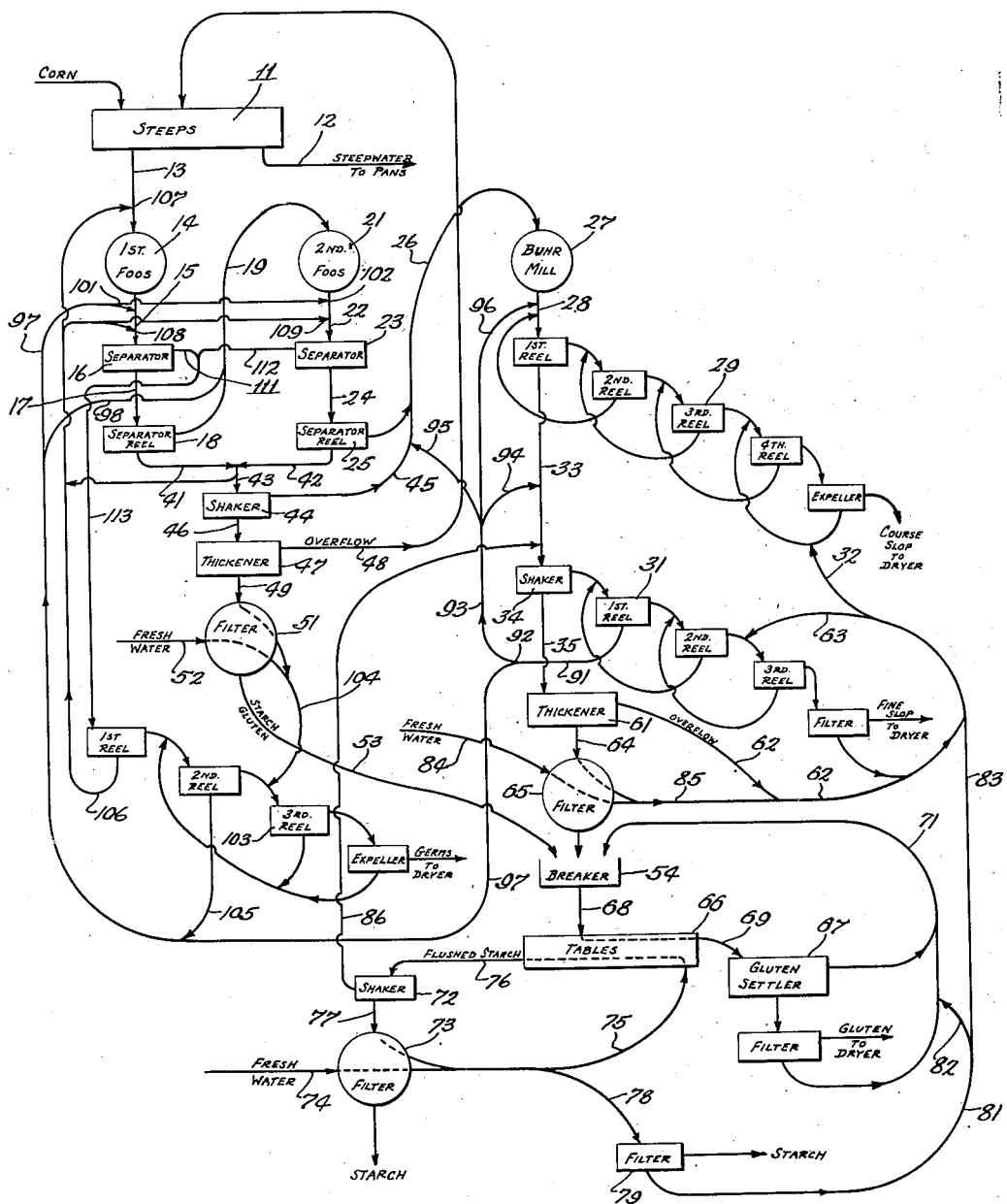

2,023,999

UNITED STATES PATENT OFFICE 2,023,999

MANUFACTURE OF STARCH

Robert Edman Greenfield and Harold R. Baker, Decatur, Ill., assignors to A. E. Staley Manufacturing Company, Decatur, Ill., a corporation of Delaware Application September 23, 1932, Serial No. 634,559

3 Claims. (Cl. 127—69)

This invention relates to the manufacture of starch from corn and has more particular reference to improvement in the handling and use of the waters employed in effecting the separation of the starch from the other ingredients, and to the recovery of the solubles.

The manufacture of starch from corn is accomplished fundamentally by water separation and flotation operations and heretofore has consisted generally in first soaking or steeping the corn, then breaking up the kernels so that the corn germs may be removed from the starch bearing materials; thereafter grinding the starch bearing materials to separate the starch and gluten from the bran and fibrous parts and finally separating the starch and the gluten. All of these operations are carried on with the use of large quantities of water employed to convey the corn during its disintegration through the various grinding mills, screening reels, filters, etc., and with the use also of a large amount of water to permit a gravity separation of the starch and gluten and the floating off of the gluten for separate disposition.

The corn contains a substantial percentage of soluble material in addition to the insoluble germs, fibers, starch, and gluten. The soluble components must, of course, be removed from the starch and should be recovered from the waters dissolving them since they are advantageously usable in the manufacture of stock feed. After removal of the germs the remainder of the corn kernels is ground in suitable mills and the grind is successively passed through sieves or screens to separate the bran and fibrous material from the starch and gluten, this bran and fibrous material being known generally in the industry as slops.

A large percentage of the solubles is extracted from the corn during the steeping and a large percentage of the remainder is taken up by the waters in the initial operations of grinding the corn and the separation of the germs. The invention contemplates the return to the steeps of the waters employed in the attrition of the corn and in the removal of the germs so that the large percentage of solubles dissolved by them is not carried through the succeeding steps of the process of separating out the starch.

It contemplates also the removal of the remaining solubles for delivery back into the process and the ultimate delivery to the steeps before the starch and gluten are delivered to the tables for the final separation of the starch from the gluten.

The invention has for a principal object the removal of all or substantially all of the solubles from the starch and gluten before the starch and gluten are delivered to the tables for separation in a manner permitting first direct return to the steeps of waters having highest soluble content and second ultimate delivery to the steeps of the remaining solubles by their return into the waters employed in the germ separation. The invention contemplates accomplishing this result by separately extracting the water from the starch milk (water containing the starch and gluten) provided as an incident to the separation of the germs from the starch bearing materials of the corn, and from the starch milk remaining after the removal of the slops in the mill house and thereafter the delivery of the starch and gluten to a breaker for repulping and delivery to the tables.

Such a process permits of delivery of water to the steeps of higher soluble concentration than has heretofore been accomplished and permits accordingly the use of larger volumes of water in the coarse and fine slop systems to effect better washing of the slops and increase recovery of starch and also in thus removing a large percentage of the solubles before they pass through the system opportunity for fermentation is minimized.

Such process permits of the provision of an improved water balance in the mill house and the separate control of the soluble concentrations in the various stages of starch separation; and permits also of separate control of the gravities of the waters employed in the germ separation, the mill house, and at the tables, together with separate control also of sulphur concentrations in these several systems. Such process permits also of delivery through the steeps to the evaporating pans of a large percentage of the solubles without permitting them to pass through the fine and coarse slop systems with resultant opportunity for fermentation.

Numerous other objects and advantages of the invention will be apparent as it is better understood from the following description, which, when taken in connection with the accompanying drawing, discloses a preferred embodiment thereof.

Referring to the drawing,

The single figure on the drawing is a flow sheet of the process embodying the present invention.

The corn is first introduced into the usual steep house, indicated on the flow sheet by reference character 11, where it is steeped for the desired or usual time and is then washed. The steep water takes up a considerable percentage of the solubles and is delivered out through a line, indicated at 12, for evaporation in pans or otherwise. After washing, the corn from which most of the steep water has been removed is delivered by a line 13 for breaking up in an attrition mill 14 (identified on the flow sheet as a Foos mill). In this mill the corn is broken sufficiently to permit separation of most of the germs. From the mill 14 the corn passes by a line 15 into a germ separator 16 wherein such germs as have been liberated from the corn are floated off for delivery to a germ washing system to be presently described. The remainder of the corn from the separator is delivered by a line 17 into a separator reel 18 in which such starch and gluten as have been separated are removed.

The partially degerminated corn is delivered from the separator reel 18 by a line 19 to a second attrition (Foos) mill 21 where the corn is further broken up to permit removal of the remaining germs. These germs with the residual fiber and starch constituents are delivered through a line 22 into a second germ separator 23 from which the remaining germs are floated off.

From the separator 23 the starch bearing material is delivered by a line 24 to a second starch separator reel 25 for removal of existent free starch and gluten. From the reel 25 the remaining starch bearing materials are carried by a line 26 to a grinding mill 27 (identified on the flow sheet as a Buhr mill), where they are finely broken up and delivered through a line 28 successively to two series of separators for removing, first, the coarser fibrous materials and bran (together called coarse slops) and then for removing the finer bran and fibers (called fine slops).

The series of separators are indicated respectively by reference characters 29 and 31. In these two series of separators the corn bearing material is serially treated with attendant removal of starch and gluten.

The starch bearing materials with the bran and fiber upon delivery from the grinding mill 27 are carried successively through the series of reels of the coarse slop system 29. Water is passed successively through each of the coarse and fine slop systems upon the counterflow principle, being delivered into the coarse slop system 29 through pipe 32 and passes successively across the reels, being finally delivered into the conduit 28 leading from the grinding mill 27.

Starch and gluten are thus carried to the head end of the system and with a certain amount of fine bran and fiber are delivered through a pipe 33 into a shaker 34 at the head end of the fine slop system. The remaining bran and fiber is taken out in this system and the separated starch milk is finally delivered into a conduit 35. Starch milk is thus produced both at the germ separating system and from the mill house and the waters carrying the starch and gluten has taken up the solubles remaining in the corn after delivery from the steep house.

The soluble concentration is higher in the germ separating system than at later stages of the process and the invention contemplates removal of the water carrying the solubles taken up in the germ separation for direct delivery to the steeps and through the steeps to the evaporating pans.

The starch milk which is produced at the separator reels 18 and 25 is delivered by lines 41 and 42 into a line 43 leading to a shaker 44 which removes the bran and fiber and delivers them through line 45 into line 26 leading to the grinding mill 27. From the shaker 44 the starch milk is carried by line 46 into a thickener 47 in which all of the water is withdrawn and delivered by pipe 48 direct to the steeps. The resulting substantially dry starch and gluten are delivered by line 49 into a filter 51 to which fresh water is delivered by line 52 for filtering and to serve as makeup water in the germ washing system as will be presently described.

The starch and gluten are delivered in substantially dry condition by conduit 53 to a breaker 54 for repulping and delivered to the tables.

The starch milk received in conduit 35 is likewise delivered to a thickener indicated by reference character 61 upon the flow sheet, in which the water (carrying the solubles) is conveyed by line 62 for delivery to line 32 leading to the coarse slop system and line 63 leading to the fine slop system.

The starch and gluten from the thickener 61 are delivered by line 64 into a filter 65 for filtering and delivery into the breaker 54. The starch and gluten from the starch milks are both therefore received into the breaker and are removed by water supplied in a closed system in which the water passes over the tables 66 to deposit the starch and through glutten settlers 67 for recovery of the gluten.

This system comprises line 68 leading from the breaker to the table, line 69 leading from the tables to the gluten settlers, and line 71 from the glutten settlers back to the breaker 54. The starch is removed from the tables and delivered to a grit shaker 72 and from the grit shaker to a filter 73.

Fresh water is delivered by line 74 to the filter 73 and after leaving the filter is passed by line 75 up to flush the starch from the tables and with the starch passes through line 76 to shaker 72 and from shaker 72 through line 77 to the filter. Some of the fresh water is delivered by a line 78 through a check filter 79 into a line 81 branching at 82 into line 71 and at 83 into line 62 from the thickener 61 to provide the makeup water for the closed circulating system through the tables and gluten settlers and part of the makeup water for the coarse and fine slop systems.

Fresh water is introduced also through line 84 to filter 65 and from this filter passes through line 85 to line 62 to supply additional makeup water for the mill house.

The grits, which are removed in the shaker 72 are carried by line 86 up for delivery into the fine slop system.

Some of the starch milk produced in the mill house is delivered to different parts of the system to control the gravity of the waters at Baumé, best calculated for efficient operation.

Some of the starch milk is removed from the fine slop system by line 91 which communicates at 92 with a line 93 extending up for delivery of starch milk through line 94 to line 33, through line 95 to line 26 and through line 96 to line 28. Line 97 also communicates with line 91 at 92 and delivers starch milk through line 98 to line 15 at 101 and to line 22 at 102. Starch milk is thus delivered into the germ separator system and mixes with the starch milk there produced and is delivered with it into the thickener 47.

The germ washing system is indicated at 103 and consists of a series of reels to which water is supplied on the counterflow principle from filter 51 by line 104. Some of the germ washing water is delivered by a line 105 into line 97 for delivery to the separators 16 and 23. The remainder of the germ washing water is carried by a line 106 up for delivery at 107 into line 13, at 108 into line 15 and at 109 into line 22. The germs are conveyed into the germ washing system from the separators 16 and 23 by lines 111, 112 and 113.

In withdrawing water for delivery to the steeps at the thickener 47 the water balance in the system is considerably improved because it is possible to use a large amount of wash water in the coarse and fine slop systems and still maintain the proper concentration of the material passing to the tables. This, in many instances, will result in a better washing of the slops and consequently an increased starch recovery. The water balance between the other separating processes and the tables is improved in that the amount and temperature of the water and the sulphur concentration used in other steps of the process do not affect the operation at the tables.

The water used for steeping contains higher concentration of solubles than the gluten settler water which is without soluble content. Moreover, by removing the water of higher concentration before it reaches the mill house it is possible to remove the proper amount of solubles and keep the soluble concentration in the wet starch system within workable limits and smaller amounts of steep water may be withdrawn than would otherwise be the case.

Since evaporation of the steep water is a relatively expensive process, a reduction in the amount evaporated results in a considerable economy. Moreover, in removing the solubles from the starch and gluten before tabling and in quickly returning a large percentage of the solubles directly to the steeps, opportunity for fermentation is minimized.

It is thought that the invention and many of its attendant advantages will be understood from the foregoing description and it will be apparent that various changes may be made in the steps and their order of accomplishing the process described without departing from the spirit and scope of the invention or sacrificing all of its material advantages, the process hereinbefore described being merely a preferred embodiment thereof.

We claim:

1. In the process for recovering starch and other products from corn in which the corn is steeped, cracked, degerminated by starch milk flotation and washed to remove fibrous constituents, the improvement which comprises dewatering the starch milk from said flotation, employing said water for steeping additional corn, washing the starch from said dewatering with fresh water, washing the germs from said flotation with said starch wash water to form additional starch milk, returning said additional starch milk to said flotation, grinding the degerminated corn from said flotation, washing the degerminated corn to remove fibrous constituents therefrom and to form a starch-gluten milk, dewatering said starch-gluten milk, employing the water from said last named step for washing said fibrous constituents, washing the dewatered starch-gluten mixture with fresh water, employing said last named wash water for washing said fibrous constituents, and returning the water from washing said fibrous constituents to said flotation.

2. In the process for recovering starch and other products from corn in which the corn is steeped, cracked, degerminated by starch milk flotation, ground, washed to remove fibrous constituents and to form a starch-gluten water suspension, tabled to separate starch from gluten and the gluten is dewatered, the improvement which comprises dewatering the starch milk from said flotation, employing said water to steep additional corn, washing the dewatered starch with fresh water, washing germs from said flotation with said starch wash water, returning said germ wash water to said flotation, dewatering said starch-gluten suspension, washing the dewatered starch-gluten mixture with fresh water, washing said fibrous constituents with said starch-gluten wash water, returning a portion of said fibrous constituents wash water to said flotation, adding water from said gluten to said dewatered materials to form a water suspension which can be tabled, filtering the tabled starch, washing the filtered starch with fresh water, and returning said last named wash water to the process.

3. In the process for recovering starch and other products from corn in which the corn is steeped, cracked, degerminated by starch flotation, ground, washed to remove fibrous constituents and to form a starch-gluten water suspension, tabled to separate starch from gluten and the gluten is dewatered, the improvement which comprises dewatering the starch milk from said flotation, employing said water to steep additional corn, washing the dewatered starch with fresh water, washing germs from said flotation with said starch wash water, returning said germ wash water to said flotation, dewatering said starch-gluten suspension, washing the dewatered starch-gluten mixture with fresh water, washing said fibrous constituents with said starch-gluten wash water, returning a portion of said fibrous constituents wash water to said flotation, adding water from said gluten to said dewatered materials to form a water suspension which can be tabled, taking up the tabled starch in water, filtering the tabled starch, washing the filtered starch with fresh water, employing a portion of the water from said filtered starch for taking up additional tabled starch, and returning an additional portion of the water from said filtered starch to the process.

ROBERT EDMAN GREENFIELD.
HAROLD R. BAKER.

CERTIFICATE OF CORRECTION.

Patent No. 2,023,999. December 10, 1935.

ROBERT EDMAN GREENFIELD, ET AL.

It is hereby certified that error appears in the printed specification of the above numbered patent requiring correction as follows: Page 3, second column, line 35, claim 3, after "starch" insert the word milk; and that the said Letters Patent should be read with this correction therein that the same may conform to the record of the case in the Patent Office.

Signed and sealed this 28th day of April, A. D. 1936.

Leslie Frazer (Seal) Acting Commissioner of Patents.